US008873796B2

(12) United States Patent
Kajihara et al.

(10) Patent No.: US 8,873,796 B2
(45) Date of Patent: Oct. 28, 2014

(54) MASS ANALYSIS DATA PROCESSING METHOD AND MASS ANALYSIS DATA PROCESSING APPARATUS

(75) Inventors: Shigeki Kajihara, Uji (JP); Masahiro Ikegami, Takaishi (JP); Hiroko Morinaga, Joyo (JP)

(73) Assignee: Shimadzu Corporation, Kyoto-Shi (JP)

( * ) Notice: Subject to any disclaimer, the term of this patent is extended or adjusted under 35 U.S.C. 154(b) by 90 days.

(21) Appl. No.: 13/048,729

(22) Filed: Mar. 15, 2011

(65) Prior Publication Data

US 2011/0228970 A1 Sep. 22, 2011

(30) Foreign Application Priority Data

Mar. 16, 2010 (JP) ................................ 2010-058644

(51) Int. Cl.
*G06K 9/00* (2006.01)
*H01J 49/00* (2006.01)

(52) U.S. Cl.
CPC ......... *H01J 49/0004* (2013.01); *H01J 49/0036* (2013.01)
USPC ............................ 382/100; 382/128; 382/133

(58) Field of Classification Search
USPC ................................. 382/100, 128, 281–282
See application file for complete search history.

(56) References Cited

U.S. PATENT DOCUMENTS

2008/0237457 A1* 10/2008 Yamashita .................... 250/281
2009/0239215 A1* 9/2009 Derosier et al. .................. 435/6

FOREIGN PATENT DOCUMENTS

JP 2007-066533 3/2007
JP 2007-157353 6/2007
JP 2007-257851 10/2007

OTHER PUBLICATIONS

Kiyoshi Ogawa et al., "Research and Development of Mass Microscope", Shimadzu Review, vol. 62, Nos. 3-4, Mar. 31, 2006, pp. 125-135.
Takahiro Harada et al., "Biological Tissue Analysis Using Mass Microscope", Shimadzu Review, vol. 64, Nos. 3-4, Apr. 24, 2008, pp. 139-146.
"Search for Biomarkers on Pathological Samples Using MS Imaging Technology", Shimadzu Corporation, Feb. 25, 2010 http://www.an.shimadzu.co.jp/bio/biomarker/297-0425_msimaging.pdf.

(Continued)

*Primary Examiner* — Matthew Bella
*Assistant Examiner* — Weiwen Yang
(74) *Attorney, Agent, or Firm* — Bingham McCutchen LLP

(57) ABSTRACT

The present invention provides a method and apparatus for efficiently handling a large amount of data collected by an imaging mass analysis to present significant information for the analysis of the tissue structure of a biological sample or other objects in an intuitively understandable form for analysis operators. For each pixel 8*b* on a sample 8, a mass-to-charge ratio m/z(i) corresponding to the maximum intensity MI(i) in a mass spectrum is listed, and the largest value MII of the maximum intensities of all the pixels are extracted. A color scale corresponding to the intensity values within a range of 0 to MII is defined. For each pixel, the maximum intensity MI is compared with the color scale to assign a color to that pixel. A mapping image with the pixels shown in the respective colors is created and displayed. Simultaneously, a spectrum showing the relationship between MI(i) and m/z(i) of all the pixels is created in such a manner that the peak colors correspond to the pixel colors on the mapping image. The mapping image shows the tissue structure of the sample. By comparing this image with the spectrum, the m/z of a noticeable substance in the sample can be identified.

4 Claims, 4 Drawing Sheets

(56) References Cited

OTHER PUBLICATIONS

H. Moringa et al., "Development of Software Using Principal Components Analysis for MS Imaging Data", Abstract of the 57th Annual Conference on Mass Spectrometry 2009, Journal of Spectrometry Society of Japan, May 1, 2009.

Japanese Office Action dated Jun. 4, 2013 for corresponding Japanese Patent Application No. 2010-058644, English translation of "Reason for Rejection".

Chinese Office Action dated Apr. 3, 2013 for corresponding Chinese Patent Application No. 201110063709.2, English translation of "Reason for Rejection".

Chinese Office Action dated Dec. 6, 2013 for corresponding Chinese Patent Application No. 201110063709.2, and the English translation of "Reason for Rejection".

* cited by examiner (a) MICROSCOPE IMAGE OF SAMPLE BEFORE MATRIX APPLICATION (b) SPATIAL DISTRIBUTION OF AVERAGE MASS SPECTRUM (a) INTENSITY SPATIAL DISTRIBUTION OF DIFFERENT IONS (b) SUPERIMPOSED IMAGE OF INTENSITY SPATIAL DISTRIBUTION

MASS ANALYSIS DATA PROCESSING METHOD AND MASS ANALYSIS DATA PROCESSING APPARATUS

The present invention relates to a mass analysis data processing method and a mass analysis data processing apparatus for analyzing mass spectrometric imaging data which are collected by performing a mass analysis for a plurality of micro areas in a two-dimensional area of a sample.

BACKGROUND OF THE INVENTION

In order to observe the morphology of a sample such as a biological tissue and simultaneously measure the distribution of the molecules existing in a specified area on the sample, apparatuses called a mass microscope or an imaging mass spectrometer have been developed (refer to: JP-A 2007-66533; JP-A 2007-157353; JP-A 2007-257851; Kiyoshi Ogawa et al., "Kenbi Shitsuryo Bunseki Sochi no Kaihatsu," ("Research and Development of Mass Microscope") *Shimadzu Review*, Shimadzu Corporation, Mar. 31, 2006, vol. 62, nos. 3-4, pp. 125-135; Takahiro Harada et al., "Kenbi Shitsuryo Bunseki Sochi ni yoru Seitai Soshiki Bunseki," ("Biological Tissue Analysis using Mass Microscope") *Shimadzu Review,* Shimadzu Corporation, Apr. 24, 2008, vol. 64, nos. 3-4, pp. 139-146; and other documents). These apparatuses require no grinding or crushing of the sample and hence are capable of obtaining a distribution image (or mapping image) of the ions having a specific mass-to-charge ratio m/z included in any area on the sample specified based on a microscopic observation can be obtained while almost completely maintaining the original morphology of the sample. These apparatuses are expected to be used, for example, to obtain distribution information of the proteins included in a living cell, particularly in the fields of biochemistry, medical care, or pharmaceutical chemistry, and other fields.

It is important for an analysis operator to easily grasp desired information on a sample, e.g. the kind of the substance that characterizes the sample or the distribution of the amount of that substance. To this end, an appropriate analysis processing should be performed to the collected mass spectrometric imaging data and the result of the processing should be displayed in an appropriate form. If mass spectrometric imaging data are obtained for a two-dimensional area of a certain area on a sample, the data will include mass spectrum data of many measurement points (micro areas). Naturally, the amount of these data is enormous. Given this factor, a variety of methods have been proposed to handle such an enormous amount of data and extract meaningful information in an easy-to-understand fashion for the analysis operator.

In one method, for example, an integrated mass spectrum which is obtained by integrating the mass spectra of all measurement points is displayed on a display window. After the analysis operator selects an appropriate peak among the peaks appearing on the integrated mass spectrum, the intensity spatial distribution of the selected peak is displayed by using a commonly available MS image display software product, such as BioMap (for example, refer to "MS Imaging Gijutsu niyoru Byori Soshiki Seppen jou ni okeru Biomarker no Tansaku," ("Search for Biomarkers on Pathological Samples using MS Imaging Technology") which is described on Shimadzu Corporation's website). FIG. 6(*a*) shows examples of the spatial distribution of the peak intensity for different mass-to-charge ratios obtained by this method, and FIG. 6(*b*) shows an example of a superimposed image of these spatial distributions. Superimposing the spatial distributions of the intensity of two or more peaks in this manner provides information relating to the structure of a specified tissue and the mass-to-charge ratio of the main substance of the tissue.

In another method, a multivariate analysis is used, such as a principal component analysis (PCA), an independent component analysis (ICA), a factor analysis (FA), and other analysis (refer to Morinaga et al., "Development of the software using Principal Component Analysis for MS Imaging Data," Abstract of the 57$^{th}$ Annual Conference on Mass Spectrometry 2009, *Journal of Spectrometry Society of Japan*, May 1, 2009 and other documents). In a multivariate analysis, two or more substances forming close intensity spatial distributions gather by factors. Generally, a score and a loading are displayed in terms of each of the factors. In the method described by Morinaga et al., the score is displayed as a two-dimensional spatial distribution, and the loading as a scatter diagram.

However, the previously described conventional methods have the following disadvantages:

In an analysis method using MS image display software, when an analysis operator selects a peak on an integrated mass spectrum, the intensity spatial distribution for a mass-to-charge ratio corresponding to the selected peak is displayed. This method does not guarantee that the selected peak always corresponds to a substance that shows a spatially specific distribution. If a peak showing a spatially specific distribution must be located for each micro area on a sample, the analysis operator needs to compare and superimpose the intensity spatial distributions of two or more peaks by trial and error. Consequently, the operator generally has to repeat the operation of displaying images for many peaks on the integrated mass spectrum, which requires a large amount of labor and time.

In a method using a multivariate analysis, specialized knowledge and skills are required in many cases to determine the number of factors and interpret the loading value of each factor. In the case of PCA, a peak having a negative intensity may be included on a displayed mass spectrum of a main component and hence it is sometimes difficult to interpret the physical meaning of the result. Therefore, not everyone can perform the analysis, which makes it difficult to efficiently perform an analysis and enhance the throughput. Another disadvantage of the PCA method exists in that the information obtained by this method is insufficient for determining the spatial distribution or content of a substance since the spatial distribution obtained by PCA shows only one main component while information relating to the substance is reflected on a plurality of main components.

SUMMARY OF THE INVENTION

The present invention has been developed to solve the aforementioned problems, and the objective thereof is to provide a mass analysis data processing method and a mass analysis data processing apparatus capable of efficiently handling a large amount of data collected by an imaging mass analysis to present significant information for the analysis of the tissue structure of a biological sample or other objects in an intuitively understandable form for analysis operators.

To solve the aforementioned problems, the first aspect of the present invention provides a mass analysis data processing method for processing data collected by performing a mass analysis on each of a plurality of micro areas set within a two-dimensional area on a sample, including:

a) a first step for extracting a maximum intensity and a mass-to-charge ratio giving the maximum intensity for each micro area, based on mass spectrum data corresponding to the micro area;

b) a second step for extracting the largest value of the maximum intensities of the micro areas obtained in the first step, for determining a color scale for displaying the intensity based on the largest value, for assigning a color to each micro area according to the color scale, the color corresponding to the maximum intensity obtained for each micro area in the first step, and for creating and displaying a colored two-dimensional image corresponding to a portion or entirety of the two-dimensional area; and c) a third step for creating a maximum-intensity spectrum showing a relationship between the maximum intensity obtained for each micro area in the first step and the mass-to-charge ratio giving the maximum intensity, and for displaying the maximum-intensity spectrum in conjunction with the colored two-dimensional image in such a manner that at least a portion of a peak having an intensity value corresponding to the largest value of a plurality of maximum intensities given by a same mass-to-charge ratio is shown using the color associated with the peak in the color scale.

The second aspect of the present invention provides a mass analysis data processing apparatus for processing data collected by performing a mass analysis on each of a plurality of micro areas set in a two-dimensional area on a sample, including:

a) an information extraction means for extracting a maximum intensity and a mass-to-charge ratio giving the maximum intensity for each micro area, based on mass spectrum data corresponding to the micro area;

b) a two-dimensional image creation means for extracting the largest value of the maximum intensities of the micro areas obtained by the information extraction means, for determining a color scale for displaying the intensity based on the largest value, for assigning a color to each micro area according to the color scale, the color corresponding to the maximum intensity obtained for each micro area by the information extraction means, for creating a colored two-dimensional image corresponding to a portion or entirety of the two-dimensional area, and for displaying the colored two-dimensional image on a display window; and c) a spectrum creation means for creating a maximum-intensity spectrum showing a relationship between the maximum intensity obtained for each micro area by the information extraction means and the mass-to-charge ratio giving the maximum intensity, and for displaying the maximum-intensity spectrum in conjunction with the colored two-dimensional image on the display window in such a manner that at least a portion of a peak having an intensity value corresponding to the largest value of a plurality of maximum intensities given by a same mass-to-charge ratio is shown using the color associated with the peak in the color scale.

In the mass analysis data processing method and mass analysis data processing apparatus according to the first and second aspects of the present invention, the data to be processed includes mass spectrum data showing the relationship between the mass-to-charge ratio and the signal intensity (ion intensity) at each of the micro areas. In the mass analysis data processing apparatus according to the second aspect of the present invention, the information extraction means searches for a peak having the highest signal intensity in the mass spectrum data of each micro area and extracts the intensity value of that peak and the mass-to-charge ratio corresponding to that peak. The reason for searching for a peak having the maximum intensity is that this peak probably corresponds to the substance that is most abundantly contained in the micro area concerned.

After the process of extracting the maximum intensity and the mass-to-charge ratio giving the maximum intensity is completed for all the micro areas, the two-dimensional image creation means searches for the largest value of the extracted maximum intensities and defines a color scale (color chart) for displaying the peak intensity within a range from zero to the largest value. Using this color scale, the two-dimensional image creation means assigns, to each micro area, a display color corresponding to the maximum intensity of that micro area and creates a colored two-dimensional image corresponding to a portion or the entirety of the two-dimensional area. This image is displayed on a display window. The colored two-dimensional image (mass spectrometric mapping image) thus displayed clearly shows the locations of the micro areas that contain a noticeable amount of substances, regardless of what kinds of peaks (i.e. what kinds of substances) are found on the mass spectrum of each micro area.

Meanwhile, the spectrum creation means creates a maximum-intensity spectrum showing the relationship between the maximum intensity of each micro area and the mass-to-charge ratio giving that maximum intensity, with the abscissa axis indicating the mass-to-charge ratio. In this maximum intensity spectrum, at least a portion of each peak is shown in the color corresponding to the largest value of the maximum intensities associated with the mass-to-charge ratio of that peak, This can be achieved as follows: For each mass-to-charge ratio, a specific color as defined in the color scale is assigned to each of the maximum intensities associated with the mass-to-charge ratio concerned. Then, the peaks indicating the maximum intensities are drawn at that mass-to-charge ratio on the maximum intensity spectrum, with one peak superimposed on another, using the respective colors. As a result, at each mass-to-charge ratio, the color corresponding to the largest value of the maximum intensities associated with the mass-to-charge ratio concerned remains visible at the top of the peak. The correspondence between the peak-top colors on the maximum-intensity spectrum and the micro-area colors in the colored two-dimensional image allows quick checking of the distribution of a substance having a specific mass-to-charge ratio.

In one preferable mode of the second aspect of the present invention, the mass analysis data processing apparatus further includes a histogram creation means for creating a histogram showing the relationship between the mass-to-charge ratio giving the maximum intensity obtained by the information extraction means and the frequency of the micro areas having the maximum intensities associated with that mass-to-charge ratio, and for displaying the histogram in conjunction with the colored two-dimensional image and the maximum-intensity spectrum on the display window. In this case, the column indicating the frequency may preferably be drawn using the colors assigned to the micro areas.

In most cases, a substance having a mass-to-charge ratio that shows a high frequency forms a maximum-intensity peak at many micro areas distributed over a wide spatial range; such a substance is unlikely to show at a specific spatial distribution. By contrast, a substance having a mass-to-charge ratio that shows a low frequency and yet gives a large maximum-intensity value may possibly be present in a limited area. Thus, the histogram provides useful information for an analysis operator to determine which micro areas are noteworthy.

With the mass analysis data processing method and the mass analysis data processing apparatus according to the present invention, it is possible to process an enormous amount of data collected by an imaging mass analysis to form information in which the spatial distribution of one or more substances contained in a sample can be easily and intuitively understood and present that information to the analysis operator. Particularly, the spatial distribution of a substance corresponding to the peak having the maximum intensity at each micro area is useful for deducing the tissue structure or other properties of the sample since such a substance is most likely to be the primary substance that is most abundantly contained in the micro area. The display of the maximum-intensity spectrum in conjunction with the spatial distribution enables the identification of the mass-to-charge ration of the substance that is noticeably contained in the sample.

The mass analysis data processing method and the mass analysis data processing apparatus according to the present invention require neither repeated peak selecting operations by trial and error nor a peak extracting process which is generally necessary in performing a multivariate analysis. Therefore, the processing time is shortened and the throughput is increased. In addition, specialized knowledge and skills as required in the methods using the multivariate analysis are not required to perform the analysis operation and interpret the result of the analysis, which advantageously alleviates the burden of the analysis operator.

EXPLANATION OF NUMERALS

1 . . . Imaging Mass Analysis Unit
2 . . . Data Processor
3 . . . Data Memory
4 . . . Microscope Image Processor
5 . . . Controller
6 . . . Operation Unit
7 . . . Display Unit
8 . . . Sample
**8*a*** . . . Two-Dimensional Measurement Area
**8*b*** . . . Micro Area (Pixel)

DETAILED DESCRIPTION OF A PREFERRED EMBODIMENT

Figure 1:
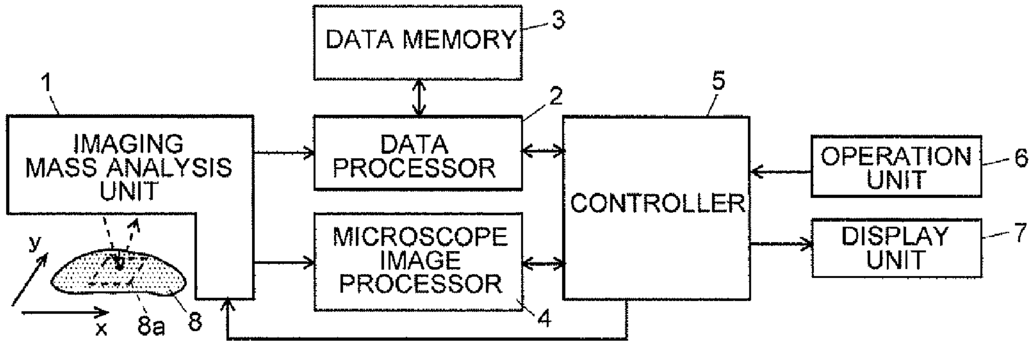
FIG. 1 is a schematic configuration diagram of an embodiment of an imaging mass spectrometer which uses the mass analysis data processing apparatus according to the present invention.

An embodiment of an imaging mass spectrometer which uses a mass analysis data processing apparatus according to the present invention will be described with reference to the attached figures. FIG. 1 is a schematic configuration diagram of the imaging mass spectrometer according to the present embodiment.

This imaging mass spectrometer includes: an imaging mass analysis unit 1 for performing a microscopic observation of a two-dimensional measurement area **8*a* on a sample 8 and for performing an imaging mass analysis within the area 8*a*; a data processor 2 for analyzing and processing the mass analysis spectrum data collected by the imaging mass analysis unit 1; a data memory 3 for memorizing the mass analysis data spectrum data; a microscope image processor 4 for processing the signal of an image photographed by the imaging mass analysis unit 1 and for forming a microscope image; a controller 5 for controlling the aforementioned units; and an operation unit 6 and a display unit 7, which are connected to the controller 5**.

The imaging mass analysis unit 1 includes, for example, a MALDI ion source, an ion transport optical system, an ion trap, a time-of-flight mass analyzer, and other units, as described in the previously mentioned papers by Ogawa et al. and Harada et al. The imaging mass analysis unit 1 performs a mass analysis across a given mass-to-charge ratio range for a micro area of a predetermined size. Although not shown, the imaging mass analysis unit 1 includes a driving unit for accurately moving a sample stage, in biaxial directions of x and y, on which the sample 8 is placed. By performing a mass analysis every time the sample 8 is moved by a predetermined step width, the mass analysis spectrum data for given areas can be collected. At least a portion of the functions of the controller 5, the data processor 2, the data memory 3, the microscope image processor 4, and other units is realized by running a dedicated processing-controlling software program installed in a personal computer.

Figure 2:
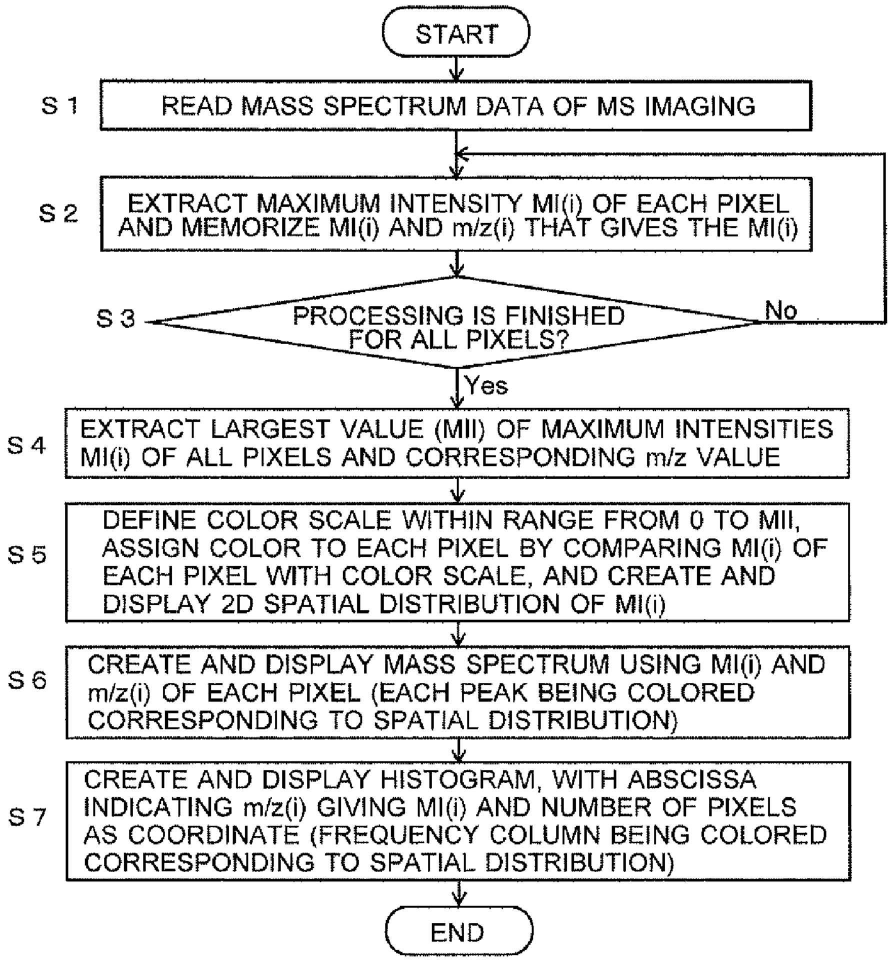
FIG. 2 is a flowchart of a data processing procedure in the imaging mass spectrometer of the present embodiment.

The imaging mass spectrometer of the present embodiment is characterized by the data processing performed by the data processor 2 to analyze and process an enormous amount of mass analysis spectrum data collected by the imaging mass analysis unit 1 and display the result of the analysis in the window of the display unit 7. An embodiment of this characterizing data processing will be described in detail with reference to FIGS. 2 and 3. FIG. 2 is a flowchart illustrating the procedures of the data processing, and FIG. 3 is a schematic diagram for explaining the process of FIG. 2.

Figure 3:
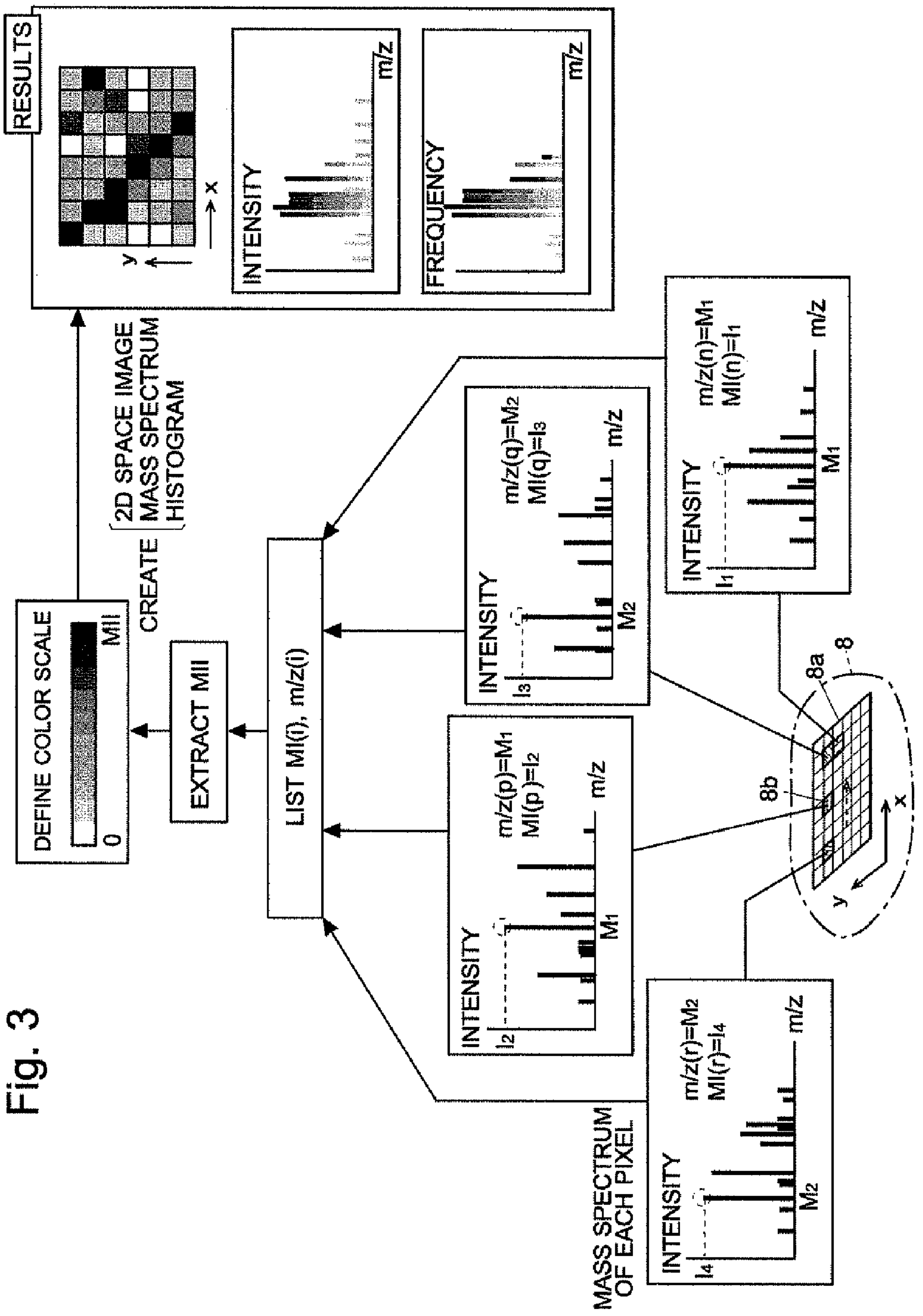
FIG. 3 is an explanation diagram of the data processing in the imaging mass spectrometer of the present embodiment.

In the imaging mass analysis unit 1, mass spectrum data can be obtained for each of the micro areas **8*b*, which are micro-sized segments arranged in both x and y directions within a given two-dimensional measurement area 8*a* on the sample 8, as illustrated in FIG. 3**. These mass spectrum data constitute mass spectra each of which shows an intensity signal across a predetermined mass-to-charge ratio range.

Generally, the length of each side of the micro area **8*b* is determined by the movement step width of the stage on which the sample 8 is placed. By performing the data processing which will be described later, the display color of one micro area 8*b* on the colored two-dimensional image is selected based on the mass spectrum data obtained for that micro area 8*b*. The micro area is therefore the minimum unit in performing an image processing such as coloring. Hence, in the present image processing, one pixel is synonymous with one micro area. In the following explanation, the micro area will be called the pixel. As illustrated in FIG. 3, the pixels are arranged in a grid pattern in the two-dimensional measurement area 8*a***. In this embodiment, identification numbers (i=1 through N) are given to the pixels according to a predetermined rule so that each number corresponds to the position coordinates of one pixel.

On receiving an order of the initiation of a data processing, the data processor 2 accesses the data memory 3 to read all the mass analysis imaging data which are to be processed, i.e. the mass spectrum data obtained for all the aforementioned N pixels (Step S1).

Next, in the order of the pixel numbers for example, the mass spectrum data corresponding to one pixel are analyzed to extract and memorize the maximum intensity (MI) of the peak signal among all the peaks appearing on the mass spectrum and the mass-to-charge ratio which gives the maximum intensity (Step S2). In Step 3, whether or not all the pixels have undergone the aforementioned processing is determined. If there is any pixel remaining, the process returns to Step S2.

In FIG. 3, four mass spectrum data corresponding to four pixels with the pixel numbers n, p, q and r are shown. The maximum intensity corresponding to the pixel number i is expressed as MI(i) and the mass-to-charge ratio corresponding thereto is expressed as m/z(i). For example, in the pixel with pixel number n, the maximum intensity $MI(n)=I_1$, and the corresponding mass-to-charge ratio $m/z(n)=M_1$. In the pixel with pixel number p, the maximum intensity $MI(p)=I_2$, and the corresponding mass-to-charge ratio $m/z(p)=M_1$. The same processing is repeated for all N pixels by repeating Steps S2 and S3. As a consequence, for all N pixels, the maximum intensities MI(1) through MI(N) and the mass-to-charge ratios m/z(1) through m/z(N) are collected and memorized.

It can be deduced that the substance corresponding to the peak giving the maximum intensity on a mass spectrum is the substance which is most abundantly contained in the pixel. Hence, the operation of searching for the maximum intensity for each pixel, which was described earlier, corresponds to a search for the most abundant substance in that pixel.

Next, the maximum intensities MI(i) obtained for all the pixels are compared with each other to extract the largest value MII and the mass-to-charge ratio m/z corresponding to that value, and these values MII and m/z are memorized (Step S4). Then, a color scale for assigning display colors for the intensity range 0 to MII is defined. The color scale may be defined in any form; a typical example is the HSV (Hue, Saturation and Value) model, which is widely used in computer systems. It should be noted that, in the system shown in FIG. 3, a gray scale is used instead of the color scale since no color is available in the drawings. After the color scale is defined, a display color is assigned to each pixel by referring to the color scale and finding the color that corresponds to the maximum intensity MI(i) of the pixel. Then, a two-dimensional mapping image with the pixels shown in the respective colors is created and displayed on the window of the display unit 7 (Step S5).

In FIG. 3, the chart shown at the top of the "Results" section is an example of the mapping image corresponding to the two-dimensional measurement area 8*a*. This mapping image clearly shows which pixel has a large maximum-intensity value and hence contains a large amount of specific substance, regardless of the kind of the peak of each pixel (i.e. the kind of the contained substance).

Using the maximum intensities MI(i) and mass-to-charge ratios m/z(i) memorized in Step S4, the data processor 2 creates a maximum-intensity spectrum similar to a mass spectrum, with the abscissa axis indicating m/z and the coordinate axis indicating the intensity, and displays the created spectrum on the window of the display unit 7 (Step S6). In this process, the peaks representative of the pixels, each peak having a peak top at the maximum intensity MI(i) and being colored according to the color scale, are drawn at the corresponding mass-to-charge ratios m/z(i), with one peak superimposed on another. As a result, if there are two or more pixels having the same mass-to-charge ratio m/z(i), and if their maximum intensities are dispersed to a certain extent, the resulting peak will be like a column having multiple segments differently colored according to the color scale. In the case of a peak having a large value of the maximum intensity MI(i), the top segment will be displayed in a color close to the color of IMI on the color scale. The pixel corresponding to that peak is also displayed in the same color on the mapping image. Such a coloring system enables the analysis operator to intuitively find a point or area on the two-dimensional measurement area 8*a* where a substance whose maximum intensity MI(i) falls within a specific intensity range is specifically distributed. In FIG. 3, the chart shown in the middle of the "Results" section is an example of the maximum-intensity spectrum.

Furthermore, the data processor 2 creates a histogram with the abscissa axis indicating m/z and the coordinate axis indicating the number (or frequency) of pixels, and displays the histogram on the window of the display unit 7 (Step S7). This histogram shows the m/z values at which the peaks having the maximum intensities MI have been extracted. On this histogram, the frequency columns are drawn in the same colors as assigned to the corresponding pixels. For example, a substance having a mass-to-charge ratio that shows a high frequency is most likely to form maximum-intensity peaks at many micro areas distributed over a wide spatial range. Such a substance is rather unlikely to be distributed at a specific point or area. By contrast, a substance having a mass-to-charge ratio that shows a rather low frequency yet gives a maximum intensity displayed in a color close to MII may possibly be present on a spatially limited area. In most cases, the latter peak is a noteworthy peak. Thus, the histogram provides useful information for locating a noticeable area on the mapping image. In FIG. 3, the chart shown at the bottom of the "Results" section is an example of the histogram.

By the previously described data processing, the apparatus according to the present embodiment displays a two-dimensional mapping image, maximum-intensity spectrum and histogram, as shown in FIG. 3, using a common color scale to indicate mutually corresponding elements.

A specific example of the previously described data processing will be described with reference to FIGS. 4 and 5. In this example, a mouse retina was used as a sample. An optical microscopic image of this sample, which was taken before the application of the matrix, is shown in FIG. 5(*a*). As the matrix, DNB (2,5-dihydroxy benzoic acid) was applied on this sample. A two-dimensional measurement area including 101×98 (=9898) pixels was set on the sample. For each pixel, a mass spectrum was obtained across a mass-to-charge ratio range of m/z500 to m/z1000. The spatial distribution of an average spectrum based on the mass spectrum data obtained for all the pixels are shown in FIG. 5(*b*).

Figure 4:
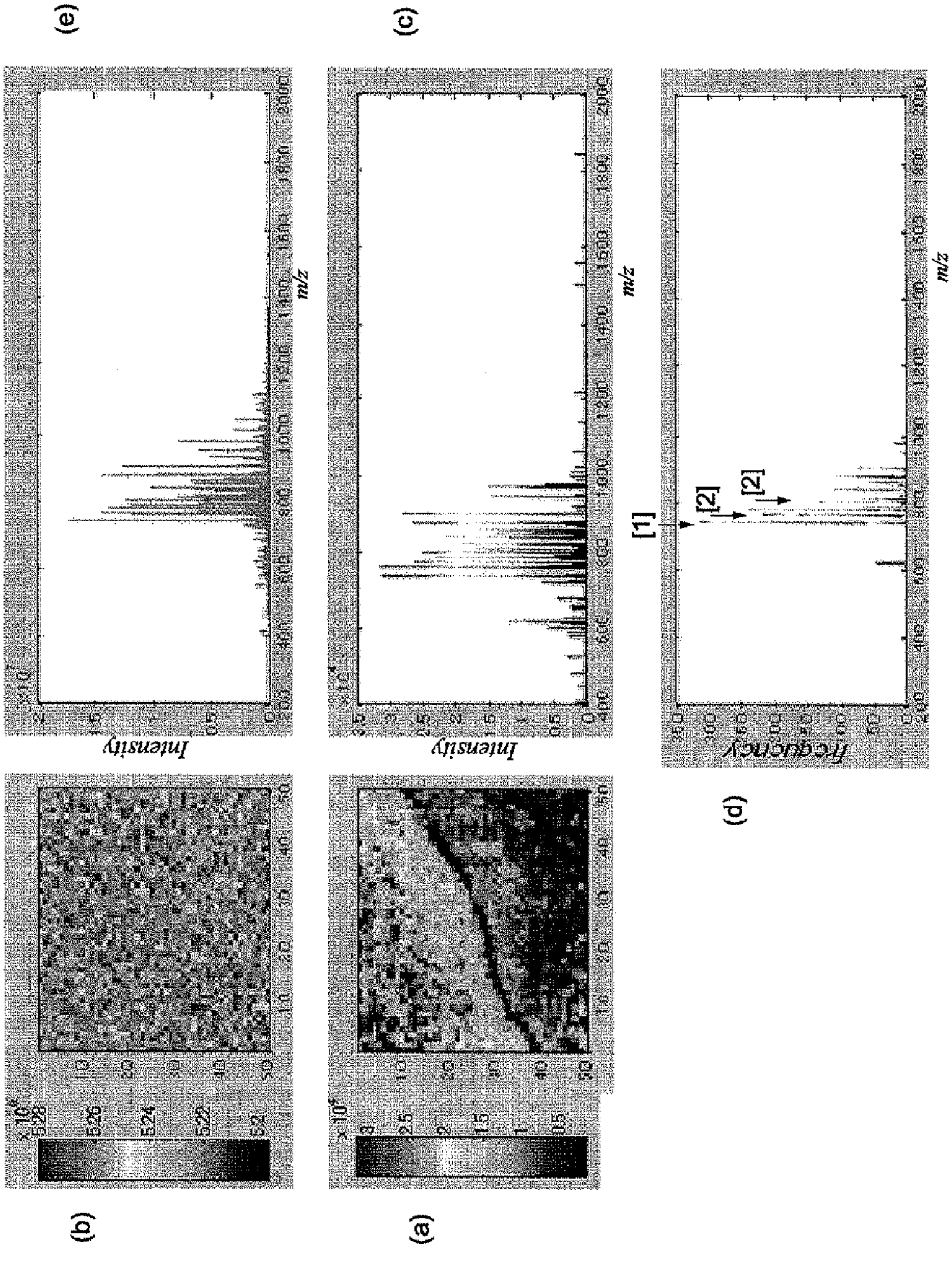
FIG. 4 shows an example of the result of the data processing in the imaging mass spectrometer of the present embodiment.
Figure 5:
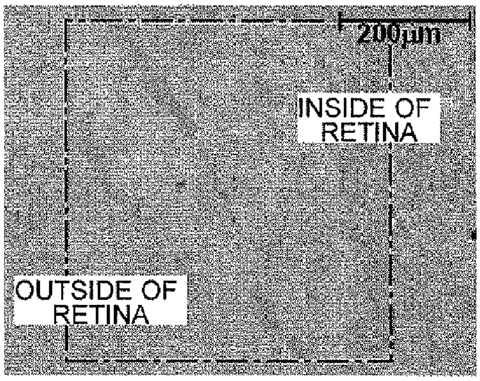
FIG. 5 shows (*a*) an optical microscopic image of the sample, which was taken before the application of a matrix and (*b*) an example of the spatial distribution chart of an average mass spectrum.
Figure 5:
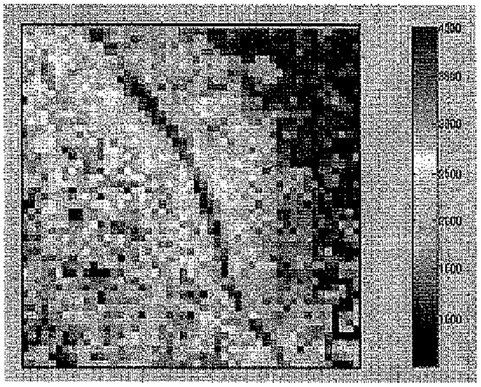
Figure 6:
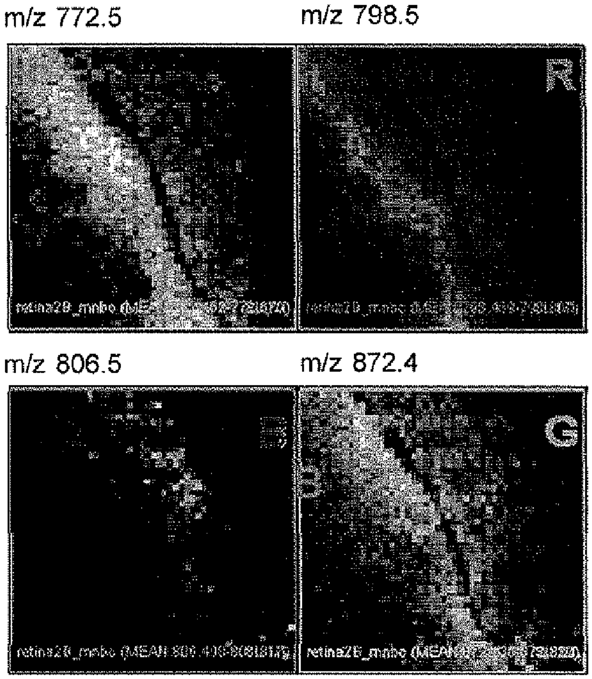
FIG. 6 shows a conventional method of displaying the spatial distribution of the ion intensity, where (*a*) shows the spatial distributions of the ion intensity for different m/z values and (*b*) is a superimposed image of these the spatial distributions.
Figure 6:

An example of the two-dimensional mapping image and the maximum-intensity spectrum created and displayed by performing a data processing on the aforementioned mass spectrum data according to the present embodiment is shown in FIG. 4(*a*). For comparison, a two-dimensional spatial distribution determined on the basis of the total ion current (TIC) of each pixel is shown in FIG. 4(*b*). In FIG. 4(*b*), no specific area on the sample can be discerned. By contrast, in FIG. 4(*a*) the presence of the retina and a specific region around it can be clearly recognized.

FIG. 4(*c*) shows a maximum-intensity spectrum created and displayed by performing a data processing according to the present embodiment. For comparison, an integrated mass spectrum is shown in FIG. 4(*e*). The spectrum in FIG. 4(*c*), which shows only the peaks of the m/z values giving the maximum intensities, is unmistakably different from the integrated mass spectrum, which reflects the entire set of the mass spectrum data including all the intensities.

As described previously, the pixel colors in FIG. 4(*a*) and the peak colors in FIG. 4(*c*) correspond to each other. For example, in FIG. 4(*c*), the peak-top color of the highest peak at m/z:734.6 is red, which demonstrates that the intensity of this peak is MII. Meanwhile, FIG. 4(*a*) shows that red pixels are specifically distributed. In this manner, for any peak whose intensity MI is represented by a specific peak-top color, the operator can intuitively tell whether, and where, the given peak is specifically located on the two-dimensional mapping image.

FIG. 4(*d*) shows a histogram created and displayed by performing the data processing according to the present embodiment. In this figure, the peak indicated by the arrow [1] has a peak-top color close to MII. However, its considerably high frequency suggests that this peak is widely distributed over a large spatial area. By contrast, the peaks indicated by the arrows [2], whose frequencies are rather low, have peak-top colors close to MII. This suggests that these peaks are probably noteworthy peaks. Accordingly, for example, the operator can additionally perform more detailed analyses focusing on the areas corresponding to those noticeable peaks.

It should be noted that the previous embodiment is a mere example of the present invention, and any change, modification or addition appropriately made within the spirit of the present invention will naturally fall within the scope of claims of the present application.

What is claimed is:

1. A mass analysis data processing method for processing collected data comprising:

a) performing a mass analysis on each of a plurality of micro areas set within a two-dimensional area on a sample to obtain mass spectrum data for each micro area;

b) extracting a maximum intensity and a mass-to-charge ratio giving the maximum intensity for each micro area, based on the mass spectrum data corresponding to the micro area;

c) extracting a largest value of the maximum intensities of the micro areas obtained in step b), determining a color scale for displaying the intensity based on the largest value, assigning a color to each micro area according to the color scale, the color corresponding to the maximum intensity obtained for each micro area in step b), and creating and displaying a colored two-dimensional image of the maximum intensity for each micro area corresponding to a portion or entirety of the two-dimensional area; and d) creating a maximum-intensity spectrum based on the mass spectrum data corresponding to the micro area showing a relationship between the maximum intensity obtained for each micro area in the step b) and the mass-to-charge ratio giving the maximum intensity, and displaying the maximum-intensity spectrum in conjunction with the colored two-dimensional image, wherein in the maximum-intensity spectrum, each peak of the maximum intensity at each micro area with the same mass-to-charge ratio is superimposed such that a resulting superimposed peak is segmented with colors according to the color scale.

2. The mass analysis data processing method according to claim 1, further comprising: creating a histogram showing a relationship between the mass-to-charge ratio giving the maximum intensity obtained in step b) and a frequency of the micro areas having the maximum intensities associated with that mass-to-charge ratio, and for displaying the histogram in conjunction with the colored two-dimensional image and the maximum-intensity spectrum.

3. A mass analysis data processing apparatus for processing collected data, comprising:

a mass analysis unit for performing a mass analysis on each of a plurality of micro areas set in a two-dimensional area on a sample to obtain mass spectrum data for each micro area;

an information extraction unit for extracting a maximum intensity and a mass-to-charge ratio giving the maximum intensity for each micro area, based on the mass spectrum data corresponding to the micro area;

a two-dimensional image creation unit for extracting a largest value of the maximum intensities of the micro areas obtained by the information extraction unit, for determining a color scale for displaying the intensity based on the largest value, for assigning a color to each micro area according to the color scale, the color corresponding to the maximum intensity obtained for each micro area by the information extraction unit, for creating a colored two-dimensional image of the maximum intensity for each micro area corresponding to a portion or entirety of the two-dimensional area, and for displaying the colored two-dimensional image on a display window; and a spectrum creation unit for creating a maximum-intensity spectrum based on the mass spectrum data corresponding to the micro area showing a relationship between the maximum intensity obtained for each micro area by the information extraction unit and the mass-to-charge ratio giving the maximum intensity, and for displaying the maximum-intensity spectrum in conjunction with the colored two-dimensional image on the display window, wherein in the maximum-intensity spectrum, each peak of the maximum intensity at each micro area with the same mass-to-charge ratio is superimposed such that a resulting superimposed peak is segmented with colors according to the color scale.

4. The mass analysis data processing apparatus according to claim 3, further comprising a histogram creation unit for creating a histogram showing the relationship between the mass-to-charge ratio giving the maximum intensity obtained by the information extraction unit and the frequency of the micro areas having the maximum intensities associated with that mass-to-charge ratio, and for displaying the histogram in conjunction with the colored two-dimensional image and the maximum-intensity spectrum on the display window.

* * * * *